United States Patent
Wen et al.

(10) Patent No.: US 8,901,911 B2
(45) Date of Patent: Dec. 2, 2014

(54) CONTROL CIRCUIT FOR SWITCHING VOLTAGE REGULATOR

(75) Inventors: Wei-Jhih Wen, Taichung (TW);
Ting-Hung Wang, Taipei (TW);
Chia-Jung Lee, Hsinchu (TW);
Shang-Ying Chung, Miaoli County (TW)

(73) Assignee: Richtek Technology Corporation, Hsinchu (TW)

( * ) Notice: Subject to any disclaimer, the term of this patent is extended or adjusted under 35 U.S.C. 154(b) by 456 days.

(21) Appl. No.: 13/420,201

(22) Filed: Mar. 14, 2012

(65) Prior Publication Data
US 2012/0235659 A1 Sep. 20, 2012

(30) Foreign Application Priority Data
Mar. 18, 2011 (TW) .............................. 100109475 A

(51) Int. Cl.
*H02M 3/156* (2006.01)
*H02M 1/00* (2006.01)

(52) U.S. Cl.
CPC ...... *H02M 3/156* (2013.01); *H02M 2001/0022* (2013.01)
USPC ........................................................ 323/288

(58) Field of Classification Search
USPC .................. 323/282, 284, 285, 288
See application file for complete search history.

(56) References Cited

U.S. PATENT DOCUMENTS

| | | | |
|---|---|---|---|
| 5,747,976 A | 5/1998 | Wong et al. | |
| 6,448,752 B1 * | 9/2002 | Umemoto | 323/288 |
| 6,456,050 B1 | 9/2002 | Agiman | |
| 6,545,882 B2 * | 4/2003 | Yang | 363/21.08 |
| 7,550,957 B2 * | 6/2009 | Ishii et al. | 323/282 |
| 2008/0279324 A1 | 11/2008 | Lin et al. | |
| 2010/0134079 A1 | 6/2010 | Liu et al. | |

FOREIGN PATENT DOCUMENTS

| | | |
|---|---|---|
| TW | 201021388 A1 | 6/2010 |
| TW | I337800 | 2/2011 |

* cited by examiner

*Primary Examiner* — Gary L Laxton
(74) *Attorney, Agent, or Firm* — Birch, Stewart, Kolasch & Birch, LLP

(57) ABSTRACT

A control circuit for a switching voltage regulator is disclosed, having a charging circuit, a discharging circuit, and a charging-discharging control circuit. The charging circuit generates a charging current according to the input voltage and the output voltage of the switching voltage regulator for charging a capacitor. The discharging circuit generates a discharging current according to the output voltage of the switching voltage regulator for discharging the capacitor. The charging-discharging control circuit configures the charging circuit, the discharging circuit, and the switching voltage regulator according to the voltage of the capacitor for providing a control signal to configure the switching voltage regulator.

12 Claims, 4 Drawing Sheets

CONTROL CIRCUIT FOR SWITCHING VOLTAGE REGULATOR

CROSS-REFERENCE TO RELATED APPLICATIONS

This application claims the benefit of priority to Taiwanese Patent Application No. 100109475, filed on Mar. 18, 2011, the entirety of which is incorporated herein by reference for all purposes.

BACKGROUND

The present disclosure generally relates to switching voltage regulators and, more particularly, to the control circuit for the switching voltage regulator.

Voltage regulators are widely used in electronics devices. For example, a power supply may convert an input voltage to a stable output voltage through the voltage regulator for providing to the load.

Voltage regulators may be roughly categorized into two types, i.e., linear voltage regulators and switching voltage regulators. Although the switching voltage regulators are more complicated, the switching voltage regulators have better energy efficiency and do not require large-sized radiators compared with the linear voltage regulators. Therefore, the switching voltage regulator seems a better choice for utilizing in the portable devices.

There is, however, something to be considered when utilizing the switching voltage regulators. For example, in conventional designs, the amplitude of the ripple of the output current (and therefore the output voltage) of the switching voltage regulator is a function of the input voltage and/or the output voltage of the switching voltage regulator. When the input voltage and/or the output voltage of the switching voltage regulator vary, the amplitude of the ripple of the output voltage varies. Thus, the output voltage of the switching voltage regulator is not stable and results in the malfunction of the load. A good switching voltage regulator should have stable output voltage ripples independent of the input voltage and/or the output voltage of the switching voltage regulator. In other words, the amplitude of the ripple of the output voltage should remain fixed even when the input voltage and/or the output voltage of the switching voltage regulator varies.

SUMMARY

In view of the foregoing, it is appreciated that a substantial need exists for apparatuses that can mitigate or reduce the problems above.

An embodiment of an example control circuit for controlling a switching voltage regulator is disclosed, comprising: a charging circuit, for generating a charging current according to an input voltage and an output voltage of the switching voltage regulator for charging a capacitor; a discharging circuit, for discharging the capacitor; and a comparator, for comparing the voltage of the capacitor with a reference voltage for providing a control signal to configure the switching voltage regulator.

An embodiment of another example control circuit for controlling a switching voltage regulator is disclosed, comprising: a current generating circuit, for generating a reference current according to the input voltage and the output voltage of the switching voltage regulator; a charging circuit, for generating a charging current to charge a capacitor according to the reference current; a discharging circuit, for discharging the capacitor; and a comparator, for comparing the voltage of the capacitor with a reference voltage for providing a control signal to configure the switching voltage regulator.

An embodiment of another control circuit for controlling a switching voltage regulator is disclosed, comprising: a charging circuit, for generating a charging current according to an input voltage and an output voltage of the switching voltage regulator for charging a capacitor; a discharging circuit, for generating a discharging current according to the output voltage of the switching voltage regulator to discharge the capacitor; and a charging-discharging control circuit, for controlling the charging circuit, the discharging circuit, and the switching voltage regulator according to the voltage of the capacitor for providing a control signal to configure the switching voltage regulator.

DETAILED DESCRIPTION

Reference will now be made in detail to embodiments of the invention, which are illustrated in the accompanying drawings. The same reference numbers may be used throughout the drawings to refer to the same or like parts or components/operations.

Certain terms are used throughout the description and following claims to refer to particular components. As one skilled in the art will appreciate, a component may be referred by different names. This disclosure does not intend to distinguish between components that differ in name but not in function. In the description and in the claims, the terms "comprise" are used in an open-ended fashion, and thus should be interpreted to mean "include, but not limited to." The phrase "coupled with" is intended to compass any indirect or direct connection. Accordingly, when this disclosure mentioned that a first device is coupled with a second device, it means that the first device may be directly or indirectly connected to the second device through an electrical connection, wireless communications, optical communications, or other signal connections with/without other intermediate devices or connection means.

Figure 1:
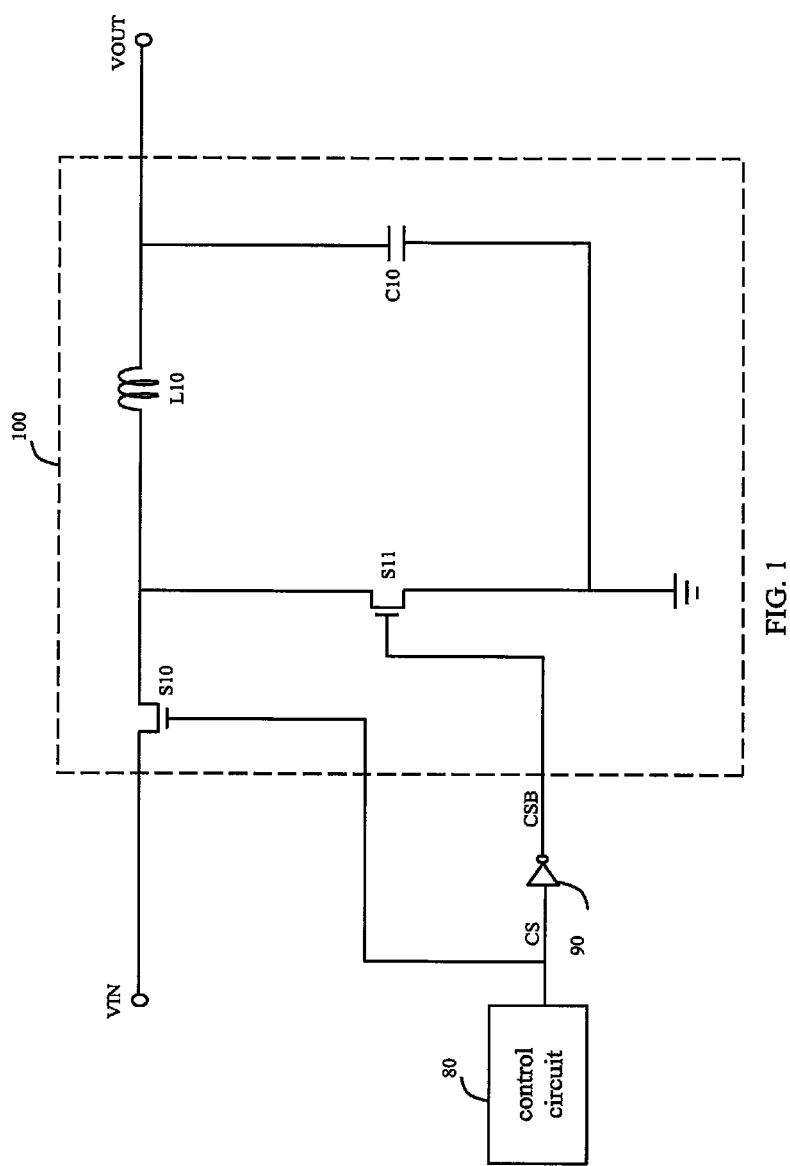
FIG. 1 shows a simplified circuit diagram of an example switching voltage regulator.

FIG. 1 shows a simplified circuit diagram of an example switching voltage regulator 100. The switching voltage regulator 100 comprises an inductor L10, a capacitor C10, and switches S10 and S11. The switching voltage regulator 100 may convert the input voltage VIN to the output voltage VOUT for providing to the load (not shown in FIG. 1) by configuring the switches S10 and S11 appropriately.

A control circuit 80 generates a control signal CS, for controlling the switch S10. A control signal CSB for controlling the switch S11 is generated by inverting the control signal CS with an inverter 90. For example, when the control signal CS conducts the switch S10, the control signal CSB, i.e., the inverted signal of the control signal CS, does not conduct the switch S11, and vice versa.

Figure 2:
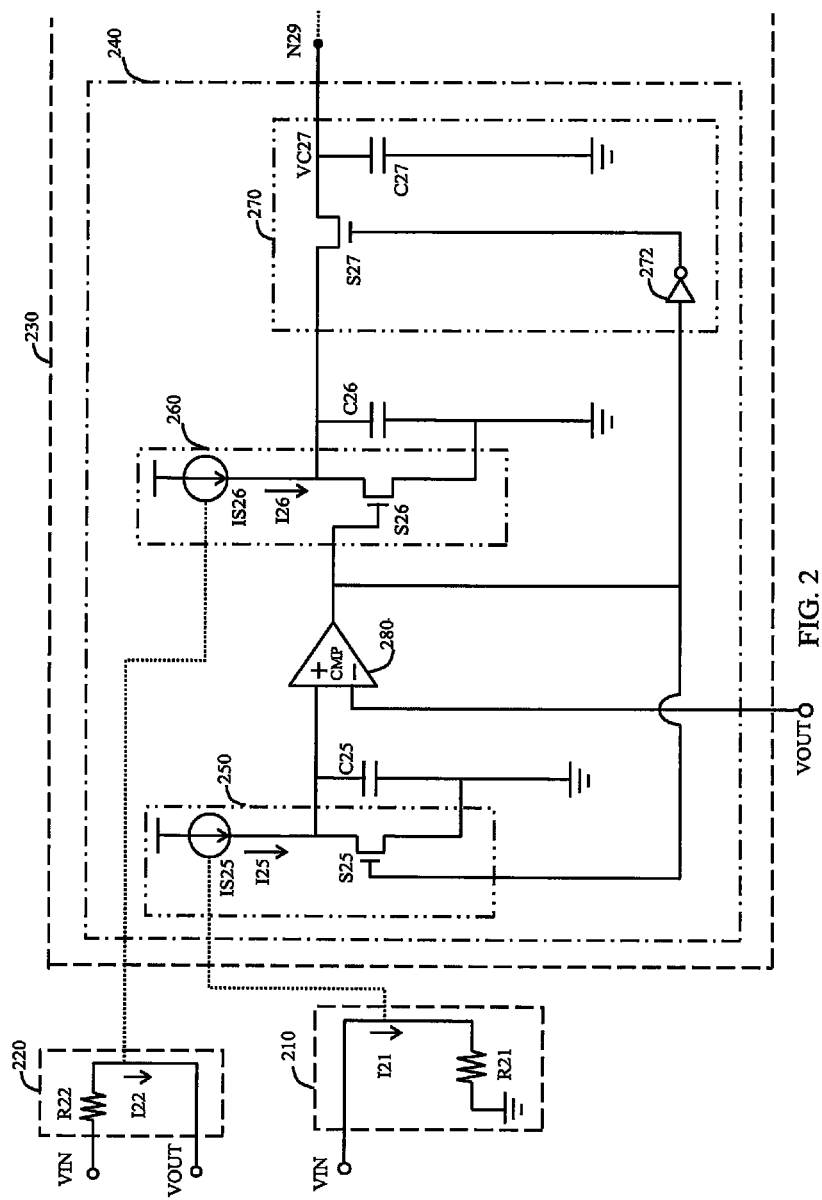
FIGS. 2 and 3 collaboratively show a simplified circuit diagram of an example control circuit in FIG. 1.
Figure 3:
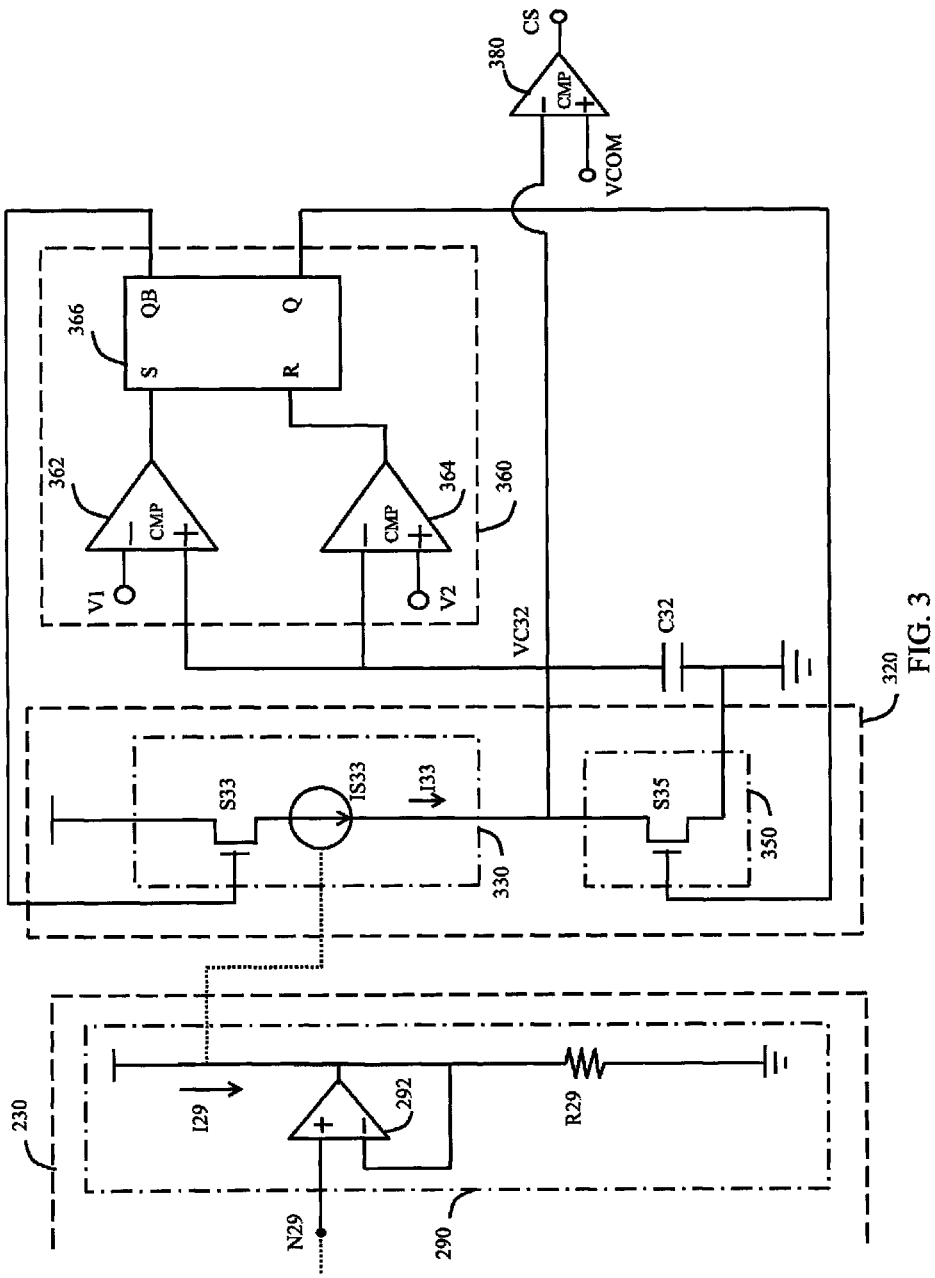

FIGS. 2 and 3 collaboratively show a simplified circuit diagram of an example control circuit in FIG. 1. The operation of the control circuit is further explained below with FIGS. 1-3. In this embodiment, the control circuit comprises a current generating circuit (comprising current generators 210 and 220 in FIG. 2, and the current generator 230 in FIGS. 2 and 3), a charging-discharging circuit 320 in FIG. 3, a charging-discharging control circuit 360 in FIG. 3, and a comparator 380 in FIG. 3. The control circuit generates the control signal CS for controlling the switching voltage regulator 100 to convert the input voltage VIN to the output voltage VOUT.

The current generating circuit comprises the current generators 210 and 220 in FIG. 2, and the current generator 230 in FIGS. 2 and 3. The current generating circuits 210, 220 and 230 receive the input voltage VIN and the output voltage VOUT and generate a reference current I29 according to the input voltage VIN and the output voltage VOUT. The reference current I29 is substantially proportional to the output voltage VOUT, substantially proportional to the difference between the input voltage VIN and the output voltage VOUT, and substantially inversely proportional to the input voltage VIN.

In this embodiment, the current generator 210 comprises a resistor R21 for generating a reference current I21 substantially proportional to the input voltage VIN. The current generator 220 comprises a resistor R22 for generating a reference current I22 substantially proportional to the difference between the input voltage VIN and the output voltage VOUT. The current generator 230 is coupled with the current generator 210 and the current generator 220 for generating the reference current I29 according to the output voltage VOUT and the reference currents I21 and I22. The reference current I29 is substantially proportional to the output voltage VOUT, substantially proportional to the reference current I22, and substantially inversely proportional to the reference current I21.

The current generator 230 comprises a voltage generator 240 in FIG. 2 and a current generator 290 in FIG. 3. For illustrative purpose, the voltage generator 240 and the current generator 290 are coupled through a node N29, respectively shown in FIGS. 2 and 3. The voltage generator 240 is coupled with the current generator 210 and the current generator 220, for generating a reference voltage VC27 according to the reference current I21, the reference current I22, and the output voltage VOUT. The reference voltage VC27 is substantially proportional to the output voltage VOUT, substantially proportional to the reference current I22, and substantially inversely proportional to the reference current I21. The current generator 290 comprises an amplifier 292 and a resistor R29, for generating the reference current I29 substantially proportional to the reference voltage VC27.

The voltage generator 240 comprises charging-discharging circuits 250 and 260, capacitors C25 and C26, a sample and hold circuit 270, and a comparator 280. The charging-discharging circuit 250 is coupled with the current generator 210 and the capacitor C25. The voltage generator 240 further comprises a current source IS25 and a switch S25. The current source IS25 generates a charging current I25 for charging the capacitor C25 according to the reference current I21. For example, the current source IS25 may generate the charging current I25 by mirroring the reference current I21 through a current mirror circuit. The charging current I25 may be equal to, a part of, or multiples of the mirrored reference current I21. When the voltage of the capacitor C25 is lower than the output voltage VOUT, the output of the comparator 280 is low and does not conduct the switch S25. Thus, the charging current I25 of the current source IS25 charges the capacitor C25. When the voltage of the capacitor C25 is equal to or higher than the output voltage VOUT, the output of the comparator 280 is high and conducts the switch S25. Thus, the switch S25 is conducted and discharges the capacitor C25.

The charging-discharging circuit 260 is coupled with the current generator 220 and the capacitor C26, and further comprises a current source IS26 and a switch S26. The current source IS26 generates a charging current I26 for charging the capacitor C26 according to the reference current I22. For example, the current source IS26 may generate the charging current I26 by mirroring the reference current I22 through a current mirror circuit. The charging current I26 may be equal to, a part of, or multiples of the mirrored reference current I22. When the voltage of the capacitor C25 is lower than the output voltage VOUT, the output of the comparator 280 is low and does not conduct the switch S26. Thus, the charging current I26 of the current source IS26 charges the capacitor C26. When the voltage of the capacitor C25 is equal to or higher than the output voltage VOUT, the output of the comparator 280 is high and conducts the switch S26. Thus, the switch S26 is conducted and discharges the capacitor C26.

The sample and hold circuit 270 is coupled with the capacitor C26 and comprises a switch S27, a capacitor C27, and an inverter 272. When the voltage of the capacitor C25 is lower than the output voltage VOUT, the output of the comparator 280 is low and the inverted output of the inverter 272 is high. The switch S27 is conducted while the switch S26 is not conducted. Thus, the charging current I26 of the current source IS26 charges the capacitors C26 and C27 to substantially the same voltage level. When the voltage of the capacitor C25 is equal to or higher than the output voltage VOUT, the output of the comparator 280 is high and the inverted output of the inverter 272 is low. The switch 26 is conducted while the switch S27 is not conducted. Thus, the sample and hold circuit 270 may sample and hold the same voltage of the capacitor C26 at the capacitor C27 before the capacitor C26 is discharged, for generating the reference voltage VC27. The reference voltage VC27 is transferred to the current generator 290.

The comparator 280 is coupled with the charging-discharging circuits 250 and 260, the sample and hold circuit 270, and the capacitor C25. The comparator 280 compares the voltage of the capacitor C25 and the output voltage VOUT for configuring the switches S25, S26, and S27.

The voltage at one end of the resistor R29 is substantially the same as the reference voltage VC27 because of the virtually short characteristic between the input nodes of the amplifier 292. The reference current I29 is therefore substantially equal to the reference voltage VC27 divided by the impedance of the resistor R29, and therefore proportional to the reference voltage VC27.

In FIG. 3, the charging-discharging circuit 320 is coupled with the current generator 230 and a capacitor C32. The charging-discharging circuit 320 comprises a charging circuit 330 and a discharging circuit 350. The charging circuit 330 comprises a switch S33 and a current source IS33. The current source IS33 generates a charging current I33 for charging the capacitor C32 according to the reference current I29. For example, the current source IS33 may generate the charging current I33 by mirroring the reference current I29 through a current mirror circuit. The charging current I33 may be equal to, a part of, or multiples of the mirrored reference current I29. The discharging circuit 350 comprises a switch S35 for discharging the capacitor C32. In this embodiment, the discharging circuit 350 only comprises a switch S35 and may discharge the capacitor in a very short time. In other embodiment, the discharging circuit 350 might be realized with other suitable circuit element(s) for configuring the discharging time, the discharging current, etc.

The charging-discharging control circuit 360 comprises comparators 362 and 364 and an SR latch 366, for configuring the switches S33 and S35 according to the voltage VC32 of the capacitor C32. When the capacitor C32 is discharged and the voltage VC32 of the capacitor C32 is equal to or lower than a reference voltage V2, the output Q of the SR latch 366 is low and does not conduct the switch S35, and the output QB of the SR latch 366 is high and conducts the switch S33. The charging current I33 of the current source IS33 charges the capacitor C32. When the capacitor C32 is charged and the voltage VC32 of the capacitor C32 is equal to or higher than a reference voltage V1, the output Q of the SR latch 366 is high and conducts the switch S35, and the output QB of the SR latch 366 is low and does not conduct the switch S33. In this embodiment, the switch S35 discharges the voltage VC32 of the capacitor C32 to be equal to or lower than the reference voltage V2 very quickly. The voltage VC32 may oscillate between the reference V1 and V2 in the sawtooth pattern. When the capacitor C32 is charged, the voltage VC32 of the capacitor C32 increases at a speed substantially proportional to the output voltage VOUT, substantially proportional to the difference between the input voltage VIN and the output voltage VOUT, and substantially inversely proportional to the input voltage VIN. When the capacitor C32 is discharged, the voltage VC32 of the capacitor C32 decreases from the reference voltage V1 to the reference voltage V2 very quickly.

The comparator 380 may compare the voltage VC32 of the capacitor C32 with a reference voltage VCOM for generating the control signal CS for configuring the switching voltage regulator. Because of the charging and discharging behaviors of the charging-discharging circuit 320 described above, when the control signal CS in FIG. 3 is used for configuring the switching voltage regulator 100, the time differentiation of the inductor current of the inductor L10 is not a function of the input voltage VIN and the output voltage VOUT. The ripples of the inductor current of the inductor L10 and the ripples of the output voltage VOUT are not affected by the input voltage VIN and the output voltage VOUT, and therefore may provide more stable output voltage to the load.

Figure 4:
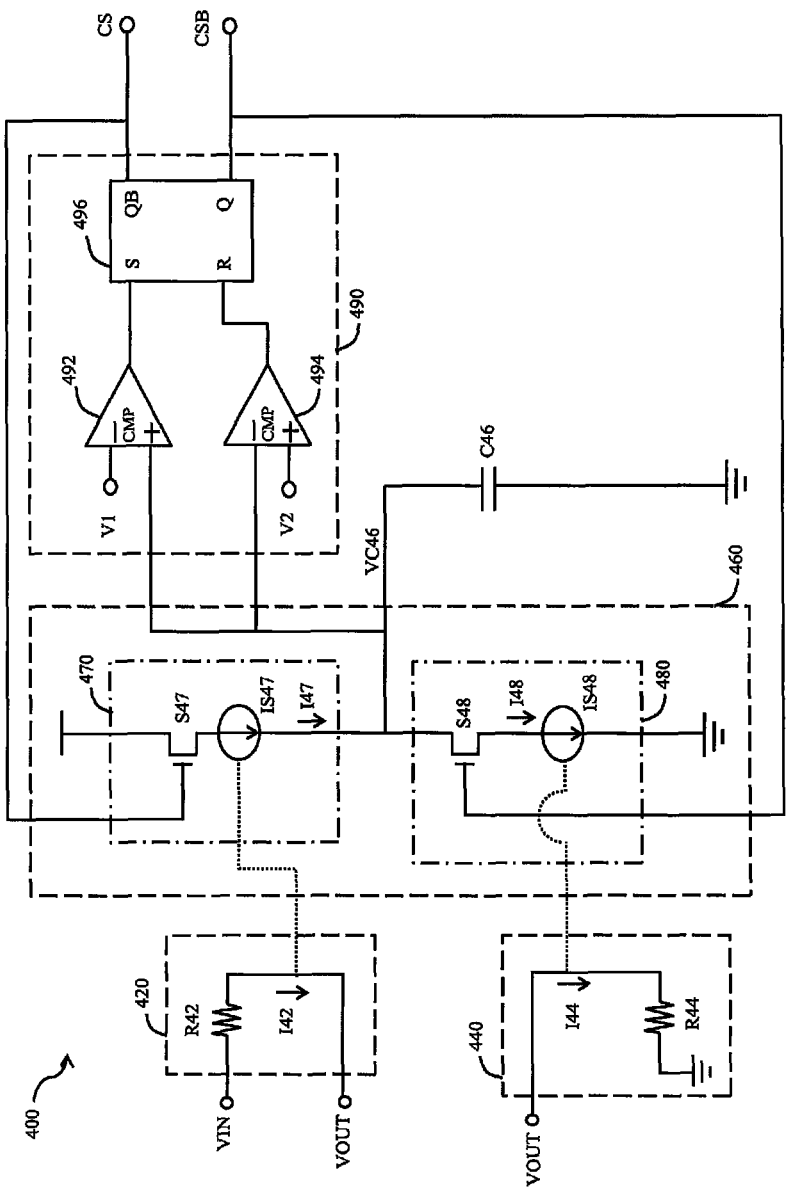
FIG. 4 shows a simplified circuit diagram of another example control circuit in FIG. 1, all arranged in accordance with at least some embodiments of the present disclose described herein.

FIG. 4 shows a simplified circuit diagram of another example control circuit in FIG. 1. A control circuit 400 is used for generating the control signal CS and CSB for controlling the switching voltage regulator 100. Because the control circuit 400 may generate both the signal CS and the inverted signal CSB for configuring the switches S10 and S11 of the switching voltage regulator, the inverter 90 may be omitted in this embodiment.

The control circuit 400 comprises current generators 420 and 440, a charging-discharging circuit 460, and a charging-discharging control circuit 490. The current generator 420 comprises a resistor R42 for generating a reference current I42 which is substantially proportional to the difference between the input voltage VIN and the output voltage VOUT. The current generator 440 comprises a resistor R44 for generating a reference current I44 which is substantially proportional to the output voltage VOUT.

The charging-discharging circuit 460 is coupled with the current generators 420 and 440 and a capacitor C46, for charging and discharging the capacitor C46. The charging-discharging circuit 460 comprises a charging circuit 470 and a discharging circuit 480. The charging circuit 470 comprises a switch S47 and a current source IS47. The current source IS47 generates a charging current I47 for charging the capacitor C46 according to the reference current I42. For example, the current source IS47 may generate the charging current I47 by mirroring the reference current I42 through a current mirror circuit. The charging current I47 may be equal to, a part of, or multiples of the mirrored reference current I42. The discharging circuit 480 comprises a switch S48 and a current source IS48. The current source IS48 generates a discharging current I48 for discharging the capacitor C46 according to the reference current I44. For example, the current source IS48 may generate the discharging current I48 by mirroring the reference current I44 through a current mirror circuit. The charging current I48 may be equal to, a part of, or multiples of the mirrored reference current I44. In one embodiment, the ratio of the currents I47 and I48 is substantially equal to the ratio of the impedance of the resistor R42 and the resistor R44. For example, when the impedance of the resistor R42 is three times of the impedance of the resistor R44, the current I47 is three times of the current I48.

The charging-discharging control circuit 490 comprises comparators 492 and 494 and an SR latch 496, for generating the control signals CS and CSB to configure the switches S47 and S48 and the switching voltage regulator 100 according to a voltage VC46 of the capacitor C46. When the capacitor C46 is discharged and the voltage VC46 of the capacitor C46 is equal to or lower than the reference voltage V2, the output Q of the SR latch 496 is low and does not conduct the switch S48, and the output QB of the SR latch 496 is high and conducts the switch S47. The current source IS47 generates the charging current I47 for charging the capacitor C46. When the capacitor C46 is charged and the voltage VC46 of the capacitor C46 is equal to or higher than the reference voltage V1, the output Q of the SR latch 496 is high and conducts the switch 48, and the output QB of the SR latch 496 is low and does not conduct the switch S47. The current source IS48 generates the discharging current I48 for discharging the capacitor C46. The voltage VC46 of the capacitor C46 oscillates between the reference voltage V1 and V2 in the sawtooth pattern. When the capacitor C46 is charged, the voltage VC46 of the capacitor C46 increases at a speed substantially proportional to the difference between the input voltage VIN and the output voltage VOUT. When the capacitor C46 is discharged, the voltage VC46 of the capacitor C46 decreases at a speed substantially proportional to the output voltage VOUT.

Because of the charging and discharging behaviors of the charging-discharging circuit 460 described above, when the control signals CS and CSB in FIG. 4 is used for controlling a switching voltage regulator 100, the time differentiation of the inductor current of the inductor L10 is not a function of the input voltage VIN and the output voltage VOUT. The ripples of the inductor current of the inductor L10 and the ripples of the output voltage VOUT are not affected by the input voltage VIN and the output voltage VOUT, and therefore may provide more stable output voltage to the load.

In addition to the foregoing features, the example control circuits in this disclosure may further make the switching voltage regulator to have good load transient response, good noise immunity, and reduced jitter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A control circuit for configuring a switching voltage regulator, comprising:

a charging circuit, for generating a charging current according to an input voltage and an output voltage of the switching voltage regulator for charging a capacitor;

a discharging circuit, for discharging the capacitor; and a comparator, for comparing the voltage of the capacitor with a reference voltage for providing a control signal to configure the switching voltage regulator;

wherein the charging current is substantially proportional to the output voltage of the switching voltage regulator, substantially proportional to the difference between the input voltage and the output voltage of the switching voltage regulator, and substantially inversely proportional to the input voltage of the switching voltage regulator.

2. A control circuit for configuring a switching voltage regulator, comprising:

a charging circuit, for generating a charging current according to an input voltage and an output voltage of the switching voltage regulator for charging a capacitor;

a discharging circuit, for discharging the capacitor;

a comparator, for comparing the voltage of the capacitor with a reference voltage for providing a control signal to configure the switching voltage regulator; and a current generating circuit, coupled with the charging circuit, for generating a reference current substantially proportional to the output voltage of the switching voltage regulator, substantially proportional to the difference between the input voltage and the output voltage of the switching voltage regulator, and substantially inversely proportional to the input voltage of the switching voltage regulator;

wherein the charging circuit generates the charging current according to the reference current.

3. The control circuit of claim 2, wherein the current generating circuit comprises:

a first current generator, for generating a first reference current substantially proportional to the input voltage of the switching voltage regulator;

a second current generator, for generating a second reference current substantially proportional to the difference between the input voltage and the output voltage of the switching voltage regulator; and a third current generator, coupled with the first current generator and the second current generator, for generating the reference current substantially proportional to the output voltage of the switching voltage regulator, substantially proportional to the second reference current, and substantially inversely proportional to the first reference current.

4. The control circuit of claim 3, wherein the third current generator comprises:

a voltage generator, coupled with the first current generator and the second current generator, for generating a reference voltage substantially proportional to the output voltage of the switching voltage regulator, substantially proportional to the second reference current, and substantially inversely proportional to the first reference current; and a fourth current generator, coupled with the voltage generator, for generating the reference current substantially proportional to the reference voltage.

5. The control circuit of claim 4, wherein the voltage generator comprises:

a first charging-discharging circuit, coupled with the first current generator, for generating a first charging current to charge a first capacitor according to the first reference current when the voltage of the first capacitor is lower than the output voltage, and for discharging the first capacitor when the voltage of the first capacitor is equal to or higher than the output voltage;

a second charging-discharging circuit, coupled with the second current generator, for generating a second charging current to charge a second capacitor according to the second reference current when the voltage of the first capacitor is lower than the output voltage, and for discharging the second capacitor when the voltage of the first capacitor is equal to or higher than the output voltage; and a sample and hold circuit, for sampling and holding the voltage of the second capacitor before the second capacitor is discharged to generate the reference voltage.

6. A control circuit for controlling a switching voltage regulator, comprising:

a current generating circuit, for generating a reference current according to an input voltage and an output voltage of the switching voltage regulator;

a charging circuit, for generating a charging current to charge a capacitor according to the reference current;

a discharging circuit, for discharging the capacitor; and a comparator, for comparing the voltage of the capacitor with a reference voltage for providing a control signal to configure the switching voltage regulator.

7. The control circuit of claim 6, wherein the reference current is substantially proportional to the output voltage of the switching voltage regulator, substantially proportional to the difference between the input voltage and the output voltage of the switching voltage regulator, and substantially inversely proportional to the input voltage of the switching voltage regulator.

8. The control circuit of claim 6, wherein the current generating circuit comprises:

a first current generator, for generating a first reference current substantially proportional to the input voltage of the switching voltage regulator;

a second current generator, for generating a second reference current substantially proportional to the difference between the input voltage and the output voltage of the switching voltage regulator; and a third current generator, coupled with the first current generator and the second current generator, for generating the reference current substantially proportional to the output voltage of the switching voltage regulator, substantially proportional to the second reference current, and substantially inversely proportional to the first reference current.

9. The control circuit of claim 8, wherein the third current generator comprises:

a voltage generator, coupled with the first current generator and the second current generator, for generating a reference voltage substantially proportional to the output voltage of the switching voltage regulator, substantially proportional to the second reference current, and substantially inversely proportional to the first reference current; and a fourth current generator, coupled with the voltage generator, for generating the reference current substantially proportional to the reference voltage.

10. The control circuit of claim 9, wherein the voltage generator comprises:

a first charging-discharging circuit, coupled with the first current generator, for generating a first charging current to charge a first capacitor according to the first reference current when the voltage of the first capacitor is lower than the output voltage, and for discharging the first capacitor when the voltage of the first capacitor is equal to or higher than the output voltage;

a second charging-discharging circuit, coupled with the second current generator, for generating a second charging current to charge a second capacitor according to the second reference current when the voltage of the first capacitor is lower than the output voltage, and for discharging the second capacitor when the voltage of the first capacitor is equal to or higher than the output voltage; and a sample and hold circuit, for sampling and holding the voltage of the second capacitor before the second capacitor is discharged to generate the reference voltage.

11. A control circuit for controlling a switching voltage regulator, comprising:

a charging circuit, for generating a charging current according to an input voltage and an output voltage of the switching voltage regulator for charging a capacitor;

a discharging circuit, for generating a discharging current according to the output voltage of the switching voltage regulator to discharge the capacitor; and a charging-discharging control circuit, for controlling the charging circuit, the discharging circuit, and the switching voltage regulator according to the voltage of the capacitor for providing a control signal to configure the switching voltage regulator;

wherein the charging current is substantially proportional to the difference between the input voltage and output voltage of the switching voltage regulator, and the discharging current is substantially proportional to the output voltage of the switching voltage regulator.

12. A control circuit for controlling a switching voltage regulator, comprising:

a charging circuit, for generating a charging current according to an input voltage and an output voltage of the switching voltage regulator for charging a capacitor;

a discharging circuit, for generating a discharging current according to the output voltage of the switching voltage regulator to discharge the capacitor;

a charging-discharging control circuit, for controlling the charging circuit, the discharging circuit, and the switching voltage regulator according to the voltage of the capacitor for providing a control signal to configure the switching voltage regulator;

a first current generator, coupled with the charging circuit, for generating a first reference current substantially proportional to the difference between the input voltage and the output voltage of the switching voltage regulator; and a second current generator, coupled with the discharging circuit, for generating a second reference current substantially proportional to the output voltage of the switching voltage regulator;

wherein the charging circuit generates the charging current according to the first reference current, and the discharging circuit generates the discharging current according to the second reference current.

* * * * *